United States Patent [19]

Lin

[11] Patent Number: 5,297,406
[45] Date of Patent: Mar. 29, 1994

[54] LOCK DEVICE FOR A STEERING WHEEL OF AN AUTOMOBILE

[76] Inventor: Chuan-Chuan Lin, I-Hsiu No. 148, I-Hsiu Li Hsueh-Chia Chen, Tainan Hsien, Taiwan

[21] Appl. No.: 948,440

[22] Filed: Sep. 22, 1992

[51] Int. Cl.$^5$ ............................................. B60R 25/02
[52] U.S. Cl. ......................................... 70/209; 70/212; 70/226; 70/238
[58] Field of Search ............... 70/209, 211, 212, 225, 70/226, 237, 238, 38 A

[56] References Cited

U.S. PATENT DOCUMENTS

| | | | |
|---|---|---|---|
| 1,234,023 | 7/1917 | Hessler | 70/212 |
| 1,443,285 | 1/1923 | Smith et al. | 70/212 |
| 3,550,409 | 12/1970 | Pariser | 70/212 |
| 4,730,470 | 3/1988 | Zane et al. | 70/211 |
| 4,747,279 | 5/1988 | Solow | 70/211 |
| 5,097,685 | 3/1992 | Lien | 70/211 |
| 5,199,284 | 4/1993 | Lin | 70/238 |

FOREIGN PATENT DOCUMENTS 2639591 6/1990 France ........................... 70/226

Primary Examiner—Peter M. Cuomo
Assistant Examiner—Darnell M. Boucher
Attorney, Agent, or Firm—Oblon, Spivak, McClelland, Maier & Neustadt

[57] ABSTRACT

A lock device locks a steering wheel in an automobile and has a retaining plate unit which includes an elongated plate body that covers two diametrically opposed portions of a rim of the steering wheel, a first pawl member fixed on the plate body and a second pawl member spaced from the first pawl member and mounted pivotally on the plate body. A blocking rod is mounted movably on the plate body. A locking mechanism includes a key plug unit and a locking rod member which locks the blocking rod releasably on the plate body in combination with the second pawl member so as to extend a portion of the blocking rod from an end portion of the plate body.

2 Claims, 6 Drawing Sheets

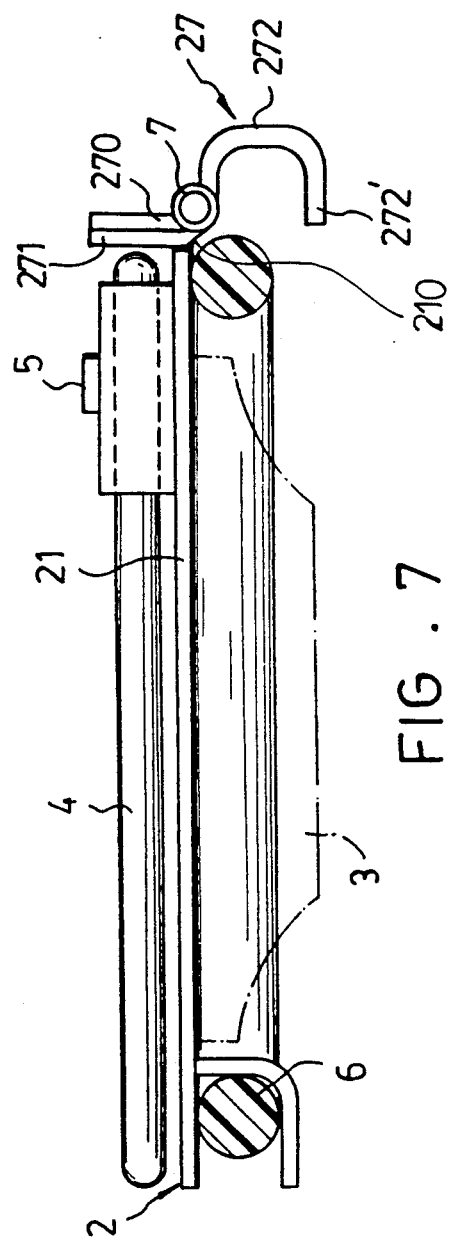
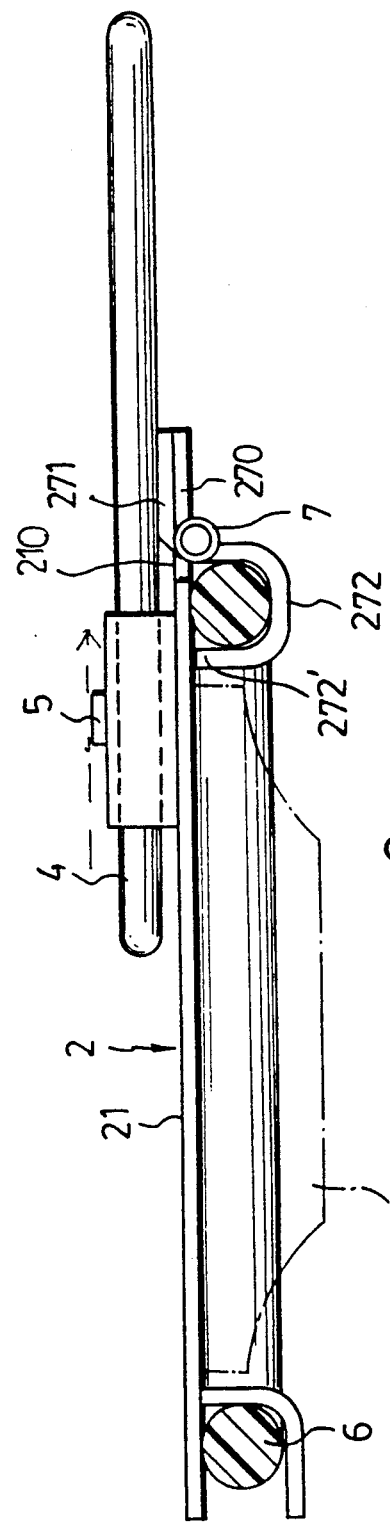

LOCK DEVICE FOR A STEERING WHEEL OF AN AUTOMOBILE

BACKGROUND OF THE INVENTION

1. Field of the Invention

This invention relates to a locking device for an automobile, more particularly to a locking device which covers and protects two diametrically opposed portions of the rim of the steering wheel in the automobile.

2. Description of the Related Art

Referring to FIG. 1, a conventional lock device (1) for locking a steering wheel of an automobile includes a J-shaped end portion (not shown) which hooks with a section of a rim of the steering wheel (14) and a guiding tube (12) in which a hooking rod (1) is retractably provided. The hooking rod (13) can be extended out of the guiding tube (12) so as to hook with another section of the steering wheel (14) opposite to the first section when the lock device is locked on the steering wheel. The rim of the steering wheel may be broken by means of a saw or the like at a portion (A) so as to remove the J-shaped end portion of the lock device from the steering wheel (14). As a result, the steering wheel can be rotated, thereby permitting a thief to steal the car which incorporates the conventional lock device.

SUMMARY OF THE INVENTION

Therefore, the main object of this invention is to provide a lock device which covers and protects two diametrically opposed portions of the rim of the steering wheel in an automobile and which is more difficult to remove therefrom, as compared to the conventional lock device.

According to this invention, a lock device locks a steering wheel in an automobile and has a retaining plate unit which includes an elongated plate body covering two diametrically opposed portions of the rim of the steering wheel, a guiding tube mounted securely on an upper surface of the plate body and receiving a blocking rod movably therein such that an end portion of the blocking rod extends out from the plate body, a first pawl member fixed on a lower surface of the plate body and which cooperates with the plate body so as to confine a first receiving space for accommodating one of the opposed portions of the steering wheel and a second pawl member spaced from the first pawl member and mounted pivotally on the lower surface of the plate body. The second pawl member is pivotable between a first position, wherein the second pawl member is generally parallel to the plate body, and a second position, wherein the second pawl member is moved away from the first position. The lock device further includes a locking mechanism which has a key plug unit formed on the upper surface of the plate body adjacent to the guiding tube, an engaging bore which extends from the lower surface of the plate body and into an interior of the guiding tube, a pair of through holes formed through the second pawl member and which are respectively aligned with the engaging bore and the key plug unit when the second pawl member is at the first position, and a U-shaped locking member which passes through the through holes of the second pawl member so as to extend into the key plug unit and the engaging bore. The U-shaped locking member is releasably retained in the engaging bore and the key plug unit when the second pawl member is at the first position.

BRIEF DESCRIPTION OF THE DRAWINGS

Other features and advantages of the present invention will become more apparent in the following detailed description, including drawings, all of which show a non-limiting form of the present invention, and in which:

FIG. 7 shows another preferred embodiment of the lock device of the present invention; and FIG. 8 shows the preferred embodiment of the lock device of FIG. 7, locking a steering wheel of an automobile.

DETAILED DESCRIPTION OF THE PREFERRED EMBODIMENT

Figure 1:
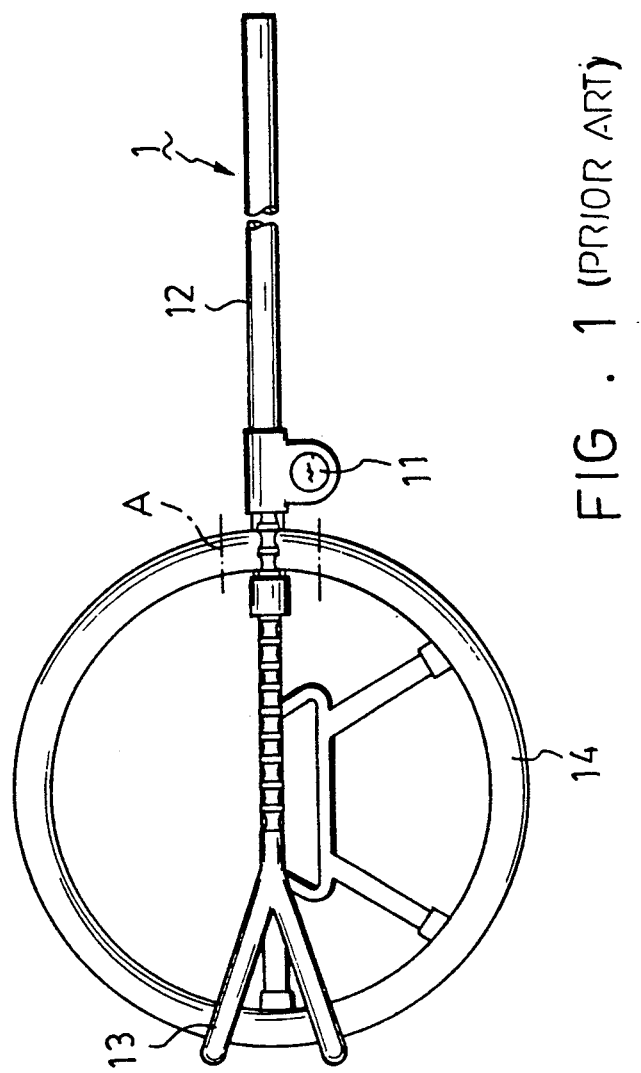
FIG. 1 shows a conventional lock device for locking a steering wheel of an automobile.
Figure 2:
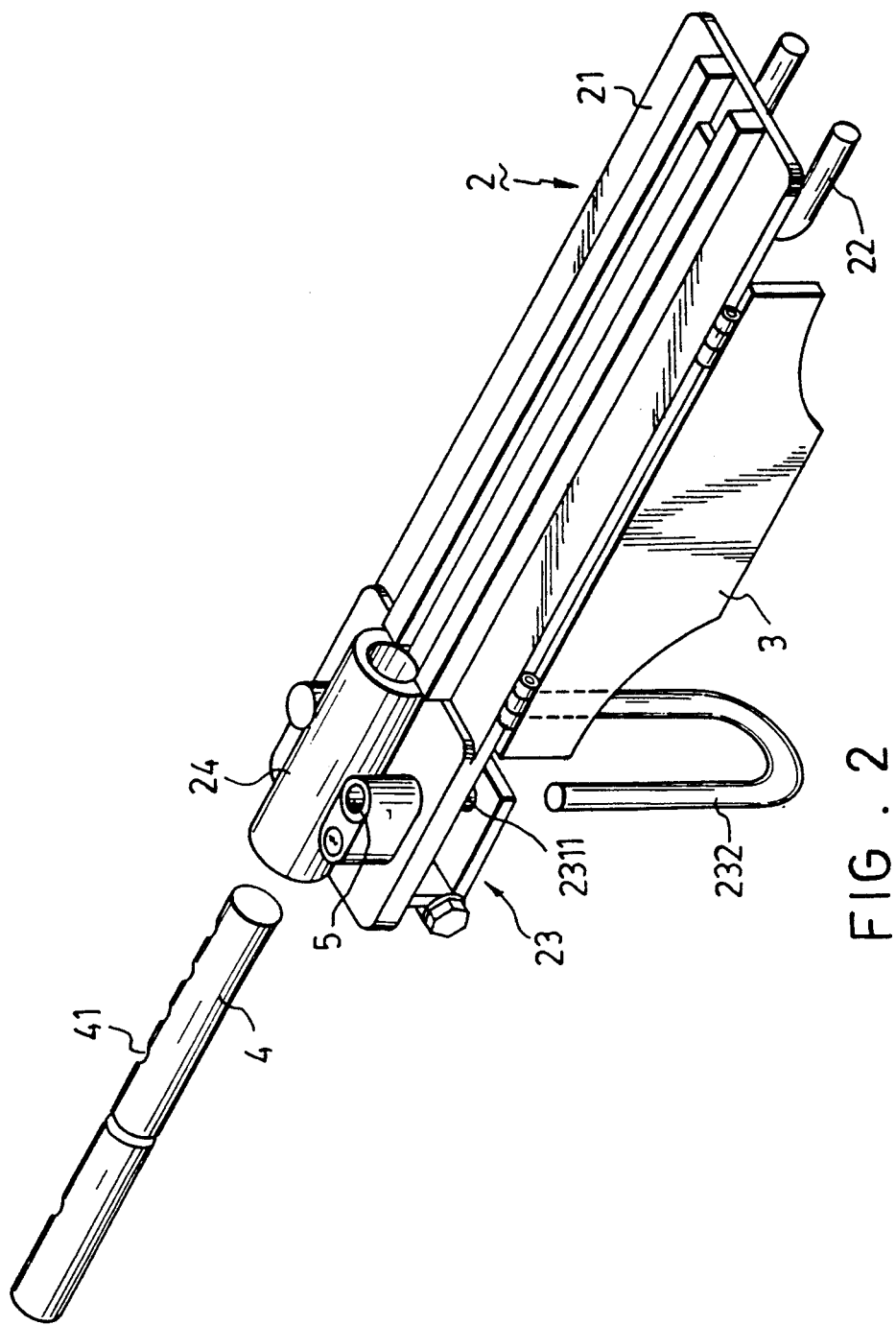
FIG. 2 shows a lock device for locking a steering wheel of an automobile according to the present invention.
Figure 3:
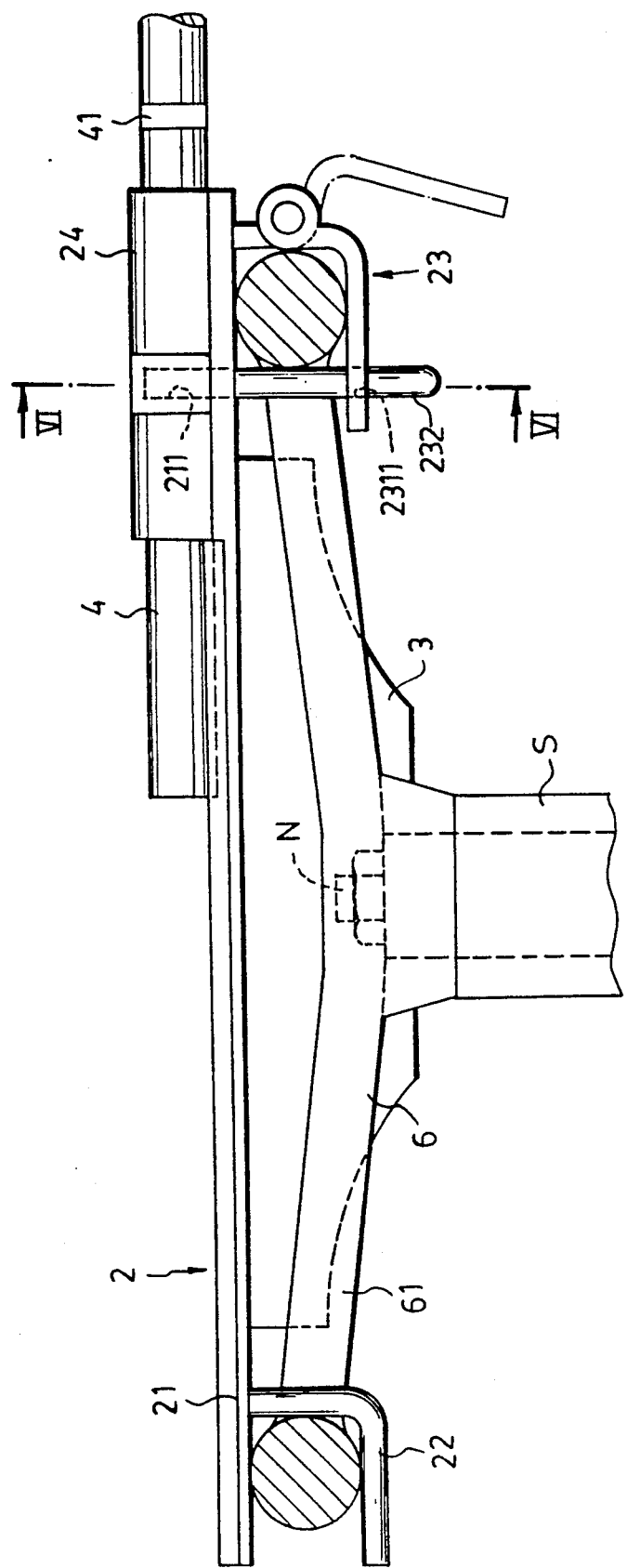
FIG. 3 shows a schematic view of the lock device of FIG. 2.
Figure 4:
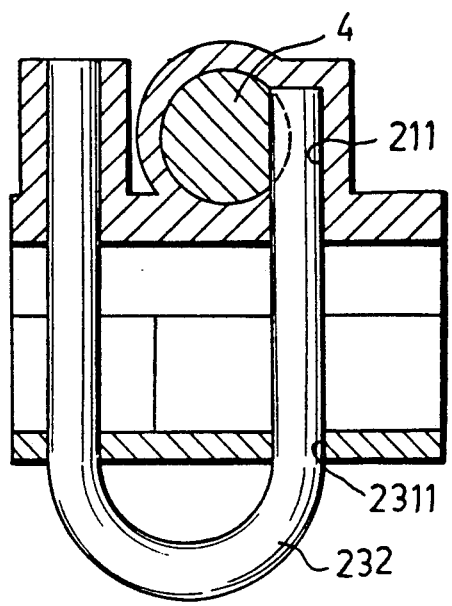
FIG. 4 a cross sectional view of the lock device of the present invention taken along the line IV—IV in FIG. 3.

Referring to FIGS. 2 and 3, a lock device of the present invention includes a retaining plate unit (2), a blocking rod (4) and a locking mechanism.

Figure 5:
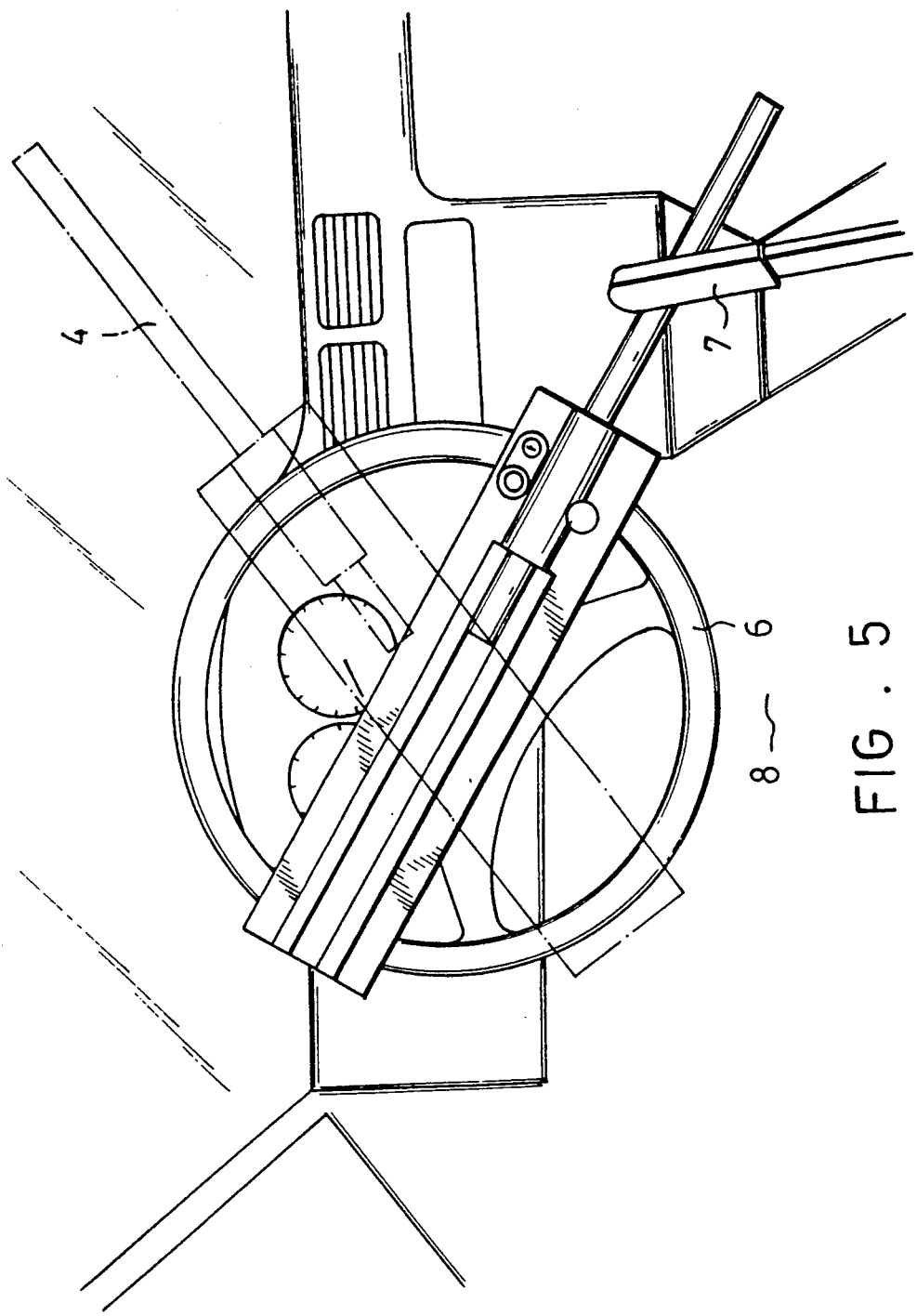
FIG. 5 shows the lock device of the present invention when used to lock two opposed portion of the steering wheel of an automobile.

The retaining plate unit (2) includes an elongated plate body (21) having an upper surface on which a guiding tube (24) is securely mounted. A blocking rod (4), which has a row of notches (41) formed along a length thereof, is movably received in the guiding tube (24) and is retained therein such that a portion of the blocking rod (4) extends out of the plate body (21) as shown in FIG. 5. The gravity center of the lock device is located near the end portion of the plate body (21) from which the blocking rod (4) extends out. When the lock device is diametrically disposed on the steering wheel (6), the lock device automatically extends downward due to the gravity and engages the steering wheel (6). The components which are employed in order to retain the blocking rod (4) in the guiding tube (24) will be explained in greater detail in the succeeding paragraphs.

A first L-shaped pawl member (22) is fixedly mounted on a lower surface of the plate body (21) and which cooperates with the latter in order to confine a receiving space for accommodating a first section of the steering wheel (6). A second L-shaped pawl member (23) is spaced from the first pawl member (22) and is mounted pivotally on the lower surface of the plate body (21). The second L-shaped pawl member (23) is pivotable relative to the plate body (21) between a first position, wherein the second L-shaped pawl member (23) is generally parallel to the plate body (21) and cooperates with the same so as to define another receiving space for accommodating a second section of the steering wheel opposite to the first section when the lock device of the present invention is diametrically locked on the steering wheel (6), and a second position, as shown by the phantom lines in FIG. 3, wherein the second L-shaped pawl member (23) is away from the first position.

The blocking rod (4) is retained in the guiding tube (24) by a locking mechanism which includes a key plug unit (5) mounted on the upper surface of the plate body (21) adjacent to the guiding tube (24), an engaging bore (211) which extends from the lower surface and into an interior of the plate body (21) and which is communicated with an interior of the guiding tube (24), a pair of through holes (2311) formed through the second pawl member (23) and respectively aligned with the key plug unit (5) and the engaging bore (211) when the second pawl member (23) is at the first position, and a U-shaped locking member (232). The U-shaped locking member (232) includes two arms which are inserted in the key plug unit (5) and the engaging bore (211) through the pair of through holes (2311) of the second pawl member (23). The key plug unit (5) employed in the preferred embodiment is conventional and includes conventional engaging means, such as a spring-loaded tumblers and the like, thereby permitting one of the inserted arms of the U-shaped locking member (232) to engage releasably the key plug unit (5). The other one of the arms of the U-shaped locking member (232), which extends in the engaging bore (211), further extends through one of the notches (41) of the blocking rod (4) to retain the blocking rod (4) at a predetermined position relative to the plate body (21). When in the locked position, the second pawl member (23) is retained at the first position by the U-shaped frame (232), thereby preventing pivoting movement of the second pawl member (23) toward the second position.

The key plug unit (5) can be rotated by means of an inserted key so as to retract the spring-loaded tumblers into the same. This permits the release of the inserted arm of the U-shaped frame (232) in the key plug unit (5) and correspondingly the locking rod (4) is released from the engaging bore (4). The second L-shaped pawl member (23) can then be pivoted relative to the plate body (21) to the second position.

As illustrated in FIGS. 3 and 5, the lock device of the present invention is generally locked diametrically on the steering wheel (6), wherein the blocking rod (4) that extends out from the plate body (21) is blocked by the gear lever (7), as indicated by the solid lines. In the event, a thief gets into the car and manages to turn the steering wheel (6) to the position indicated by the phantom lines, further rotation of the steering wheel (6) is prevented because movement of the outwardly extending blocking rod (4) is limited by the windshield or the roof of the car. Limited rotation of the steering wheel (6) prevents the thief from driving the car to a desired place. In actual use, the steering wheel (6) is usually rotated in a clockwise direction until it can not be rotated further before the lock device of the present invention is locked diametrically thereon.

In the preferred embodiment, a blocking plate (3) is pivotally mounted at a longitudinal edge of the same. When the lock device of the present invention is disposed diametrically on a steering wheel of an automobile so as to lock two opposed portions of the steering wheel (6), the plate body (21) covers the nut (N) which fastens the steering wheel (6) to the steering shaft (S). The blocking plate (3) extends downwardly with respect to the plate body (21), and the periphery of the blocking plate (3) is in contact with ribs (61) of the steering wheel (6). Under these conditions, the blocking plate (3) is prevented by the ribs (61) of the steering wheel (6) from pivoting upward relative to the plate body (21), thereby providing added protection by denying direct access to the nut (N).

Figure 6:
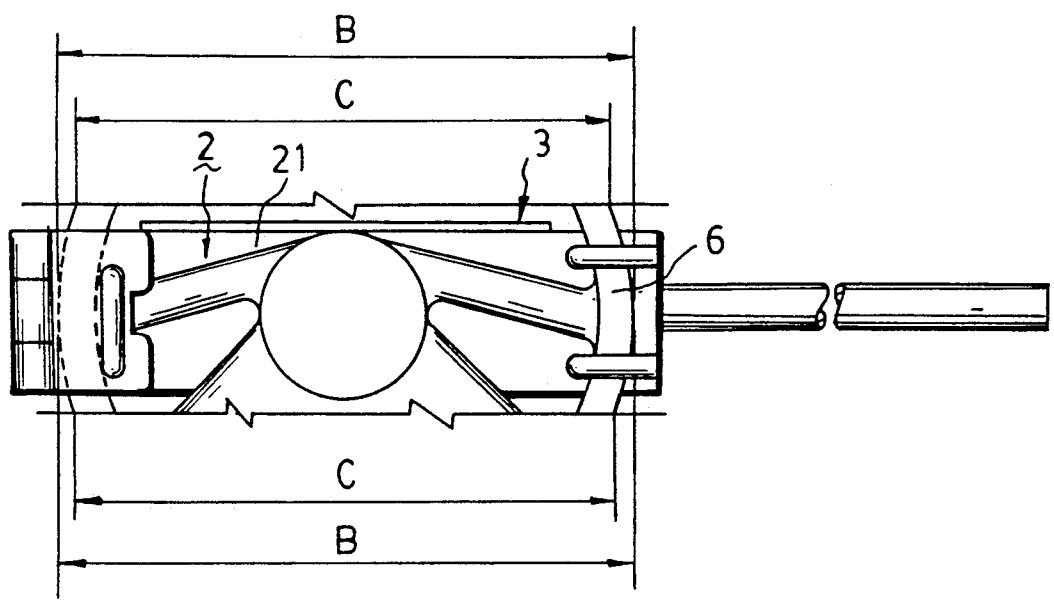
FIG. 6 shows the lock device of the present invention when viewed from a bottom side.

Referring to FIG. 6, because the diametrically opposed portions (B) of the steering wheel are covered by the lock device, in the event that an area (C) of the steering wheel (6), which is outside of the ribs (61), is removed from the steering wheel (6) by means of a saw and the like, the lock device cannot be removed from the steering wheel (6) without the assistance of tools. Note that it is because the portion (B) of the steering wheel (6) which engages to the lock device is greater than the area (C) which is sawed, the steering wheel (6) is broken, the wheel (6) can not be easily rotated due to the outwardly extending blocking rod (4) from the plate body (21). In addition, the blocking plate (3) provides added protection by denying access to the nut (N) that engages the steering wheel (6), since the blocking plate (3) can not be pivoted upward relative to the plate body (21). Accordingly, it is difficult for a thief to steal a car which incorporates the lock device of the present invention.

Referring to FIGS. 7 and 8, in another preferred embodiment of the present invention, the plate body (21) has an elongated slot (210) which extends along and which is disposed adjacent to the guiding tube (24). The second pawl member can be replaced by an abutting rod (270) which is integral with the U-shaped locking member (272) so as to form a pivot unit (27). The abutting rod (270) has an abutting stud (271) formed thereon. The pivot unit (27) is hinged to the plate body (21) adjacent to the guiding tube (24) such that the abutting rod (270) extends through the elongated slot (210) as shown in FIG. 7. When the blocking rod (4) is moved to the right as shown by the phantom arrow, the blocking rod (4) pushes the abutting stud (271) such that the pivot unit (27) pivots about 90 degrees in which a free end (272') of the pivot unit (27) abuts with the lower surface of the plate body (21) thereby retaining a portion of the steering wheel therein. The objective and feature are the same as in the previous embodiment.

While a preferred embodiment has been illustrated, and described, it will be apparent that many changes and modifications may be made in the general construction and arrangement of the present invention without departing from the spirit and scope thereof. Therefore, it is desired that the present invention should not be limited to the exact disclosure but only to the extend of the appended claims.

I claim:

1. A lock device for a steering wheel of an automobile, said steering wheel including a circular rim, a fastening member at a center of said circular rim and a plurality of ribs extending radially from said fastening member to connect with said circular rim, said lock device comprising:

a retaining unit including an elongated plate body capable of covering upper surfaces of two diametrically opposed portions of said circular rim, said elongated plate body having a guiding tube which is formed on an upper surface and which extends along a longitudinal length of said plate body, and an elongated blocking rod having a row of notches along a length thereof, said blocking rod being movably received in said guiding tube, one end of said blocking rod extending out from a first end of said plate body;

a first pawl member fixed on a lower surface adjacent to a second end of said plate body, said first pawl member cooperating with said plate body to form a hooking portion which is capable of locking one of said diametrically opposed portions of said circular rim;

a second pawl member spaced from said first pawl member and mounted pivotally on said lower surface adjacent to said first end of said plate body, said second pawl member being pivotable relative to said plate body between a first position, wherein said second pawl member is generally parallel to and cooperates with said plate body to confine a receiving space that is capable of receiving a remaining one of said diametrically opposed portions of said circular rim, and a second position which is farther away from said plate body than said first position;

said plate body further having an engaging bore extending from said lower surface thereof and being communicated with an interior of said guiding tube;

said second pawl member having a first through hole formed therethrough and aligned with said engaging bore of said plate body when said second pawl member is at said first position;

a locking rod member having a first end inserted into said engaging bore of said plate body through said first through hole of said second pawl member, said first end of said locking rod member extending into one of said notches of said blocking rod, thereby limiting movement of said blocking rod in said guiding tube and preventing said second pawl member from rotating from said first position to said second position; and means for releasably retaining said locking rod member in said engaging bore;

wherein said elongated plate body further includes a longitudinal edge and a blocking plate mounted pivotally thereto, said blocking plate having a periphery in contact with said ribs which prevent said blocking plate from pivoting upward relative to said plate body when said second pawl member is at said first position.

2. A lock device as defined in claim 1, wherein said second pawl member further includes a second through hole spaced from said first through hole, said retaining means including a key plug unit mounted on said plate body, said locking rod member being a U-shaped frame having a second end passing through said second through hole and extending into said key plug unit, wherein said key plug unit releasably and rotatably engages said second end therein when said first end of said locking rod member is retained in said engaging bore.

* * * * *